June 6, 1967 E. J. SCHNEBERGER 3,324,288

DATA PROCESSING APPARATUS INCLUDING MEANS FOR CORRECTING CODES ARRANGED IN A PACKED FORMAT

Filed Sept. 27, 1963

EDWARD J. SCHNEBERGER
INVENTOR.

BY Arthur Frelich

ATTORNEY

United States Patent Office 3,324,288
Patented June 6, 1967

3,324,288

DATA PROCESSING APPARATUS INCLUDING MEANS FOR CORRECTING CODES ARRANGED IN A PACKED FORMAT

Edward J. Schneberger, Los Angeles, Calif., assignor, by mesne assignments, to The Bunker-Ramo Corporation, Stamford, Conn., a corporation of Delaware Filed Sept. 27, 1963, Ser. No. 312,211
11 Claims. (Cl. 235—154)

Figure 1:
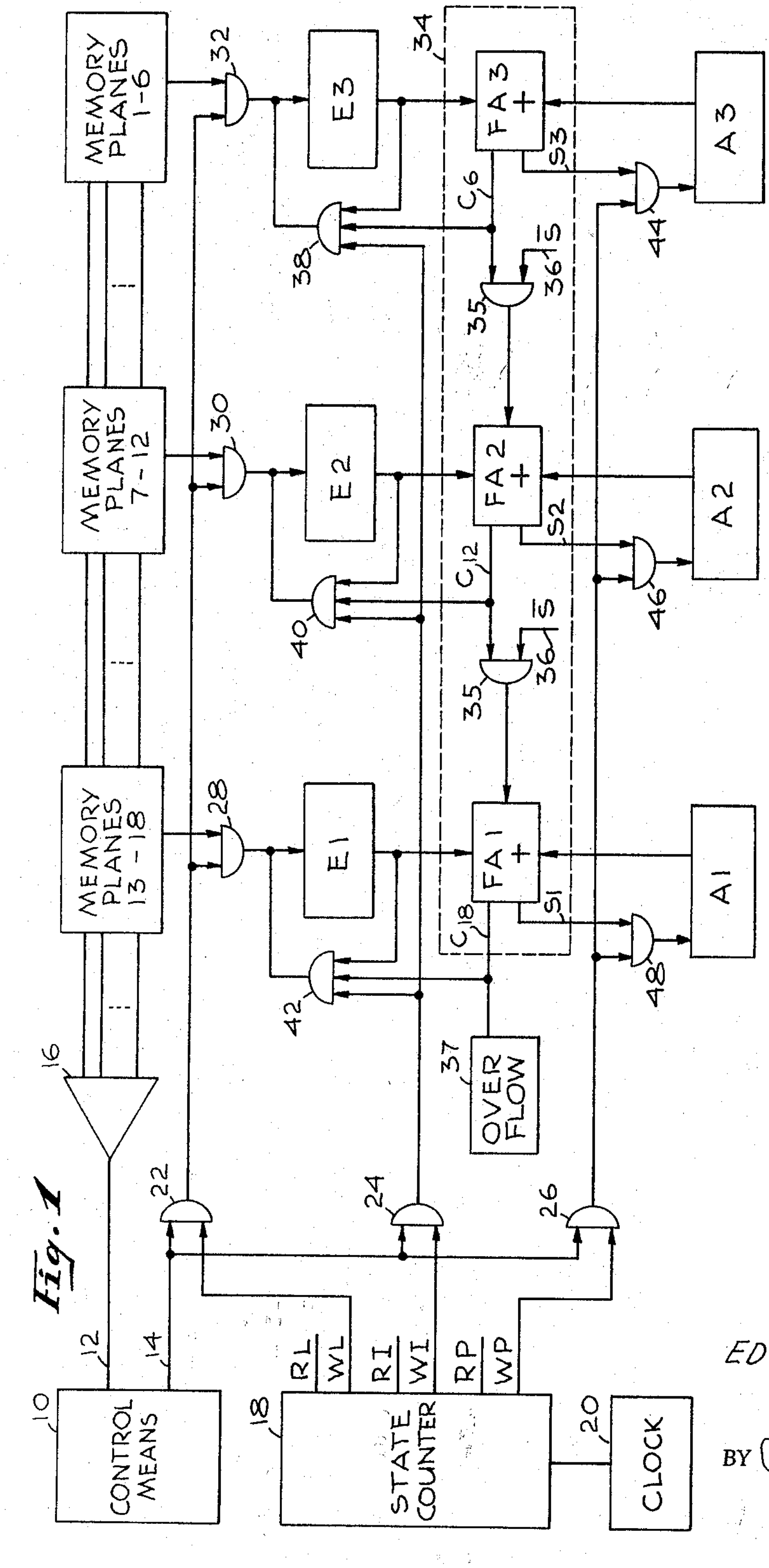

This invention relates generally to improvements in digital data processing apparatus.

From a user's standpoint, digital data processing apparatus, and more particularly general purpose digital computers, can be considered as comprised of two broad categories; i.e. digital computers better adapted to handle scientific type computing problems and digital computers better adapted to handle business type computing problems.

Usually, scientific type computers utilize a word oriented format while business type computers utilize either a word or character oriented format. As a general rule, where a word oriented computer is used for business applications, its hardware, due to the character nature of the data being handled, is utilized relatively inefficiently. The inefficiency results from the fact that the characters, rather than words, must be operated upon in a serial or sequential manner.

On the other hand, where character oriented computers are used for business applications, the computer hardware is efficiently utilized but performance is rather slow inasmuch as each character is necessarily handled in a serial manner. In an attempt to combine the desirable attributes of word and character oriented computers, a digital data processing apparatus is disclosed in U.S. Patent No. 3,292,158 which makes use of a character formatted word. Basically, the approach relied on in that application is to utilize character formatted data but to perform parallel operations on such data wherever possible. That is, operations are performed on full words, each word containing the same number of characters. Many operations, e.g. searching, sorting, comparing, etc. can thereby be performed on full words despite the fact that the words contain characters.

It would of course be desirable to perform arithmetic operations, such as addition and subtraction on character formatted words also. However, a procedure by which this could be accomplished is not readily apparent due to problems presented when permissible code limits are exceeded. More particularly, alphanumeric character data is generally presented as a six bit code wherein decimal numeric data is coded as a subset of the 64 codes thus possible. This type of coding presents the problem of generating carry signals between characters when a sum exceeds the equivalent of decimal nine. In character oriented computers, intercharacter carry signals can be handled by the arithmetic unit in a straightforward fashion. In word oriented computers, as taught in the prior art, the characters are usually unpacked to a one character per word format. After each addition of two characters, the sum is tested by comparison or subtraction to see if it is equal to or greater than the equivalent of decimal ten. If it is not, the next addition can be performed immediately. If, on the other hand, it is equal to or greater than the equivalent of decimal ten, it must be corrected to the range zero to nine by subtracting ten from it. Then a carry of one must be added to one of the next pair of characters before proceeding with their addition.

It will of course be realized that much programming including a plurality of branch points and considerable processing time is required to unpack, test and correct character data in word oriented computers in the aforedescribed manner.

Accordingly, it is an object of this invention to provide improved means which permit characters arranged in a packed format to be tested and corrected without necessitating that they be initially unpacked and without requiring the use of a program including a plurality of branch points.

Briefly, the invention is based on the recognition that the characters of a packed word stored in a first register can be tested and corrected by adding appropriate constant characters arranged in a packed format, in a second register, to the packed word. By then utilizing intercharacter carry signals consequently generated to clear the corresponding constant character in the second register and again adding the contents of the first and second registers, a corrected packed word will be obtained.

Figure 2:
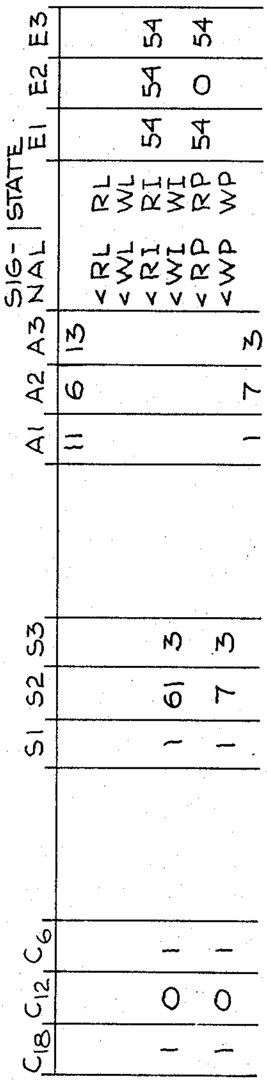

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a portion of a digital data processing apparatus embodying the present invention; and FIG. 2 is a table showing the contents of the various registers illustrated in FIG. 1 at different times in the performance of a correction operation on typical data.

It is common practice to represent alphanumeric characters by six bit (binary digit) codes in digital data processing apparatus. Use of six bits permits sixty-four different codes to be generated thereby permitting the assignment of a different code to each letter of the alphabet, each decimal numeral, and each of several special symbols. Generally, the code assigned to represent each decimal numeral is its binary equivalent. For example, the characters in a typical set of alphanumeric characters can be represented as follows:

| Alphanumeric: | Code |
|---|---|
| 0 | 000000 |
| 1 | 000001 |
| 2 | 000010 |
| 3 | 000011 |
| 4 | 000100 |
| 5 | 000101 |
| 6 | 000110 |
| 7 | 000111 |
| 8 | 001000 |
| 9 | 001001 |
| A | 001010 |
| B | 001011 |
| C | 001100 |
| D | 001101 |
| E | 001110 |
| F | 001111 |
| G | 010000 |
| H | 010001 |
| I | 010010 |
| J | 010011 |

If the code representing two decimal numerals are added according to the rules of binary arithmetic, the resulting code will properly represent the decimal sum only if the decimal sum is within the subset of codes assigned to represent decimal numerals. For example, if the following addition were performed Example No. 1:

```
000010 (2)
000011 (3)
----------
000101 (5)
```

the resulting sum code is correct since it lies within the subset representing decimal numerals or in other words the decimal sum (5) is less than the decimal numeral nine. If on the other hand, the following addition were performed Example No. 2:

```
000100 (4)
000111 (7)
----------
001011 (B)
```

the resulting sum code is indistinguishable from the code for the letter "B" and has to be corrected in order to properly represent the decimal sum. Similar corrections are required to correct the difference obtained in the performance of subtraction by the conventional technique of adding the complement of the subtrahend to the complement of the numerand.

The above examples assume additions on unpacked data, that is data in which only one character is contained in each computer word. Where data is packed, i.e. where more than one character is contained in each computer word, considerable difficulties have been encountered in the prior art in attempting to add two words without unpacking them. As a result, known prior art methods and apparatus capable of performing the necessary correcting always unpack multicharacter words to a one character per word format. After each addition of two characters, the sum is tested by comparison or a subtraction to see if it is equal to or greater than decimal numeral ten and therefore determine if there is need for correcting the sum. If it does not have to be corrected, a further addition can be performed immediately. If on the other hand the sum has to be corrected, it is adjusted to the range between decimal numeral zero and nine by subtracting ten from it. Then a carry of one is added to one of the next pair of characters to be added before proceeding with their addition. Addition and correction in an unpacked format as is done in the prior art is inefficient and time consuming. The advantages secured by operating on characters in parallel, i.e. in a packed format are discussed in the above cited U.S. 3,292,158.

The invention herein is directed toward means which permits characters arranged in a packed format to be corrected without requiring that they be unpacked. The embodiment of the invention disclosed herein makes use of an 18 bit word containing three characters. It should be understood however that this word length has been chosen for illustrative purposes only and that the invention is as equally applicable to words and characters of any length.

Assume the following exemplary addition.

Example No. 3 (initial sum):

| Character 1 | Character 2 | Character 3 |
|---|---|---|
| 000111 (7) | 000100 (4) | 000101 (5) |
| 000100 (4) | 000010 (2) | 001000 (8) |
| 001001 (11) | 000110 (6) | 001101 (13) |

Note that characters 1 and 3 in the resulting sum exceed the maximum character code in the subset of codes assigned to decimal numerals and therefore must be corrected. That is, they would appear to other portions of the data processing apparatus as representing the letters B and D respectively, rather than decimal numerals. In accordance with the invention, correction is accomplished by initially adding a constant representing the difference (i.e. decimal 54) between the number of codes in the subset (i.e. 10) and the total number of possible codes or radix (i.e. 64) to each character to determine whether or not each character has to be corrected. A character has to be corrected if, when added to the constant (i.e. 54) it exceeds the maximum character code possible in the complete set of codes (i.e. 64) or in other words produces a carry or an overflow. If no overflow is produced, correction is not required. Note that when the constant 54 is added to the characters of the initial sum (i.e. the sum developed in Example No. 3), characters 1 and 3 of the intermediate sum (i.e. the sumer developed in Example No. 4) overflow or in the words exceed the maximum set character code (i.e. 63).

Example No. 4 (intermediate sum):

| Character 1 | Character 2 | Character 3 |
|---|---|---|
| 001001 (11) | 000110 (6) | 001101 (13) |
| 110110 (54) | 110110 (54) | 110110 (54) |
| [1] 000001 (65) | 111101 (61) | ←[1] 000011 (67) |

Correction of the initial sum in a packed word format is accomplished by adding the constant (i.e. 54) to only those characters that are in need of correction (as indicated by the production of an overlow in the intermediate sum) and appropriately adding carriers to characters higher significance to thereby obtain the following.

Example No. 5 (corrected initial sum):

| Character 1 | Character 2 | Character 3 |
|---|---|---|
| 001011 (11) | 000110 (6) | 001101 (13) |
| 110110 (54) | 000000 (0) | 110110 (54) |
| ←[1] 000001 (1) | 000111 (7) | ←[1] 000011 (3) |

From the foregoing examples, it should be apparent that the sum of the decimal numerals 745 and 428 as originally obtained in Example No. 3 has been corrected without requiring that the packed words representing the decimal numerals be unpacked. In Example No. 5, note that a carry was developed by adding the constant to the third character and that this carry was added to the second character of the initial sum which was not summed with the constant. The carry out of the addition of the third character and the constant is an overflow which can be further manipulated for multi-word additions.

Attention is now called to FIGURE 1 which illustrates a preferred implementation for correcting a packed word in accordance with the invention. A pair of registers respectively designated as the E and A registers are provided. Each of these registers includes a number of stages corresponding to the number of bits in a full word which it will be recalled has been assumed to be 18. In addition, each of the E and A registers can be considered as being comprised of three character sections. That is, the E register includes character sections E3, E2, and E1 which respectively include stages 1 through 6, stages 7 through 12, and stages 13 through 18. Similarly, the A register includes character sections A3, A2, and A1 which respectively include stages 1 through 6, 7 through 12, and 13 through 18.

It is pointed out that FIGURE 1 illustrates only that portion of a digital data processing apparatus necessary to teach the invention. The unillustrated portions of the data processing apparatus can be of a substantially conventional construction which should be apparent to one skilled in the art. Consequently, a control means is illustrated as a box 10 having a pair of output terminals 12 and 14. The output terminal 12 is utilized to communicate memory addresses to a decoding network 16. The output of the decoding network 16 is connected to a digital memory having a conventional construction. For example, the memory can be a coincident current magnetic core type memory including 18 memory planes, each plane comprised of cores respresenting the corresponding bit in each of a plurality of words. Terminal 14 is a control terminal which is set true by the control means 10 in order to initiate a correction operation in accordance with the present invention.

A state counter 18 is provided which functions to define a plurality of discrete states. The states successively defined by the state counter 18 will be respectively designated by the following nomenclature:

State 1—RL (read logical command),
State 2—WL (write logical command),
State 3—RI (read intermediate),
State 4—WI (write intermediate),
State 5—RP (read operand), and
State 6—WP (write operand).

The state counter 18 successively changes state in response to clock pulses generated by clock 20. In response to each state change, the state counter 18 will generate a gating signal on one of its output terminals. Each gating signal will be identified by the same nomenclature as that identifying the state at the end of which the gating signal is generated. For example, if the state counter 18 defines state WL, the next clock pulse generated by clock 20 will cause gating signal WL to be generated.

The reason that the state counter 18 has been illustrated as alternately defining read and write states is because the typical memory utilized in digital data processing apparatus is of the destructive readout type which necessitates that information be restored or written into the memory immediately after it is read out if it is to be preserved. Information is read out of the memory during the three read states while information is written into the memory during the three write states. In other words, information can be written into the memory in response to the generation of read gating signals while information can be read from the memory in response to the generation of write gating signals. Only the three write gating signals need be utilized in the arithmetic manipulation of the present invention.

The output terminals of state counter 18 respectively providing gating signals WL, WI, and WP are connected to the inputs of AND gates 22, 24, and 26 respectively. In addition, the control terminal 14 is connected to the inputs of AND gates 22, 24, and 26.

The output of AND gate 22 is connected to the input of each of AND gates 28, 30, and 32. The output of memory planes 13 through 18, 7 through 12, and 1 through 6 are respectively connected to the inputs of AND gates 28, 30, and 32. The outputs of AND gates 28, 30, and 32 are respectively connected to the inputs of character sections E1, E2, and E3.

A full adder 34 is provided which also consists of three sections respectively identified as FA1, FA2, and FA3. Each of the adder sections consists of six stages capable of adding two six bit character codes. Each of the adder sections consists of a pair of data input terminals, a carry input terminal, a carry output terminal, and a sum output terminal. The illustrated data input and sum output terminals are representative of six conductors capable of actually handling six bits in parallel. The carry input and carry output terminals in each section are respectively connected to the least and most significant stages of the section.

The data input terminals of each of the adder sections are connected to the output terminals of corresponding E and A register character sections. For example, note that the data input terminals of adder section FA3 are respectively connected to the output terminals of character sections E3 and A3. The carry output terminals from the adder section FA3, which constitutes the carry output terminal of stage 6 of the full adder, is connected to the input of a first AND gate 35. The output of the first gate 35 is connected to the carry input terminal of full adder section FA2. Similarly, the carry output of stage 12 of the full adder is connected to the input of a second AND gate 35. The output of second gate 35 is connected to the carry input terminal of full adder section FA1. A second input to each of gates 35 comprise a control terminal 36 responsive to control means 10. When an uncorrected difference resulting from a subtraction operation is being corrected the control terminal 36 will disable the gates 35 to prevent carry propagation between characters as described below. At all other times, the control terminal 36 will enable gates 35 to permit carry propagation. The carry output terminal from stage 18 of the full adder is connected to the input of an overflow indicator 37.

The output of character section E3 is connected to the input of AND gate 38 together with the carry output terminal of full adder section FA3. The output of AND gate 38 is connected to the input of character section E3. Similarly, the output of character section E2 is connected to the input of AND gate 40 together with the carry output terminal of full adder section FA2. The output of AND gate 40 is connected to the input of character section E2. Similarly, the output of character section E1 is connected to the input of AND gate 42 together with the carry output of full adder section FA1. The output of AND gate 42 is connected to the input of character section E1. The output of AND gate 24 is connected to the input of each of AND gates 38, 40, and 42.

The sum output terminal of full adder section FA3 is connected to the input of AND gate 44 whose output is connected to the input of character section A3. Similarly, the sum output terminal of full adder section FA2 is connected to the input of AND gate 46 whose output is connected to the input of character section A2. Similarly, the sum output of full adder section FA1 is connected to the input of AND gate 48 whose output is connected to the input of character section A1. The output of AND gate 26 is connected to the input of each of the AND gates 44, 46, and 48.

In order to explain the operation of the apparatus of FIGURE 1, attention is called to the table of FIGURE 2 which illustrates the contents of the A and E registers and the outputs of the sum and carry output terminals of each of the full adder sections at various times. Let it be initally assumed that an uncorrected number, such as the uncorrected sum developed in Example 3 above is stored in the A register. In response to gating signal WL and consequently during state RI, the contents of a particular cell in the memory will be accessed and entered into the sections of the E register. As indicated in FIGURE 2, the contents entered into each section of the E register comprises the constant decimal numeral 54. As a consequence, carry signals will be developed in the adders which will be applied to the carry output terminals of full adder sections FA1 and FA3 while no carry signal will be developed by full adder section FA2. The sum developed by full adder sections FA1, FA2, and FA3 will respectively be decimal numerals 1, 61, and 3. As noted in FIGURE 1, the carry output terminals from each of the full adder sections is gated into an AND gate together with the output of the corresponding E register section. As a consequence in response to the generation of gating signal WI, the constants 54 will be rewritten into E register sections E1 and E3 and the register section E2 will be cleared. The full adder sections FA1, FA2, and FA3 will then respectively develop the decimal numeral sums of 1, 7, 3, respectively. It should be noted that the carry output from full adder section FA3 is added in section FA2 and that the carry output from full adder section FA1 is used to set the overflow indicator 37. In response to the generation of gating signal WP, the sums so developed by the full adder sections will be entered through gates 44, 46, and 48 into A register sections A3, A2, and A1 respectively.

From the foregoing, it should be appreciated that an uncorrected number stored in the A register can be corrected without necessitating that the characters of that number be unpacked, as required by prior art methods and apparatus.

Although the aforedescribed method and apparatus finds particular utility in correcting decimal numbers as illustrated, the concept can be easily extended to process a variety of formats other than decimal. For example, consider that a word comprised of three characters represents hours and minutes in the following manner.

Example No. 6:

| Hours | Minutes | |
|---|---|---|
| 5 | 7 | 3 |

Note that the minutes entry has exceeded decimal numeral 59 which should be the maximum minute code indication. This is, instead of Example No. 6 appearing as it does, it should appear in its corrected form as Example No. 7:

| Hours | Minutes | |
|---|---|---|
| 6 | 1 | 3 |

The correction from Example No. 6 to No. 7 can be accomplished in the same manner as the aforedescribed decimal numerals except for the fact that different constants have to be employed. That is, whereas decimal numeral 9 is the highest permissible decimal numeral representable in the minutes unit's place, decimal numeral 5 is the highest numeral representable in the minutes ten's place. Consequently, in order to correct the minutes unit's place, the constant 54 should be added to the minutes unit's place as shown in the following example and the constant 58 (the difference between 6 and 64) should be added to the minutes ten's place:

Example No. 8:

| Hours | Minutes | |
|---|---|---|
| 000101 (5) | 000111 (7) | 000011 (3) |
| | 111010 (58) | 110110 (54) |
| | ←[1]000001 (65) | 111001 (57) |

The reason for adding a constant of 58 to the minutes ten's place is that the minutes ten's place should overflow into the hour's place when it contains a decimal numeral above decimal 5. As seen in Example No. 8 above, when the appropriate constants are added to the decimal numerals representing the uncorrected hours and minutes to thereby develop an intermediate sum, only the minutes ten's place overflows. Consequently, in Example No. 9 below, a constant is added only to the uncorrected minutes ten's place numeral to arrive at a corrected sum.

Example No. 9:

| | | |
|---|---|---|
| 000101 (5) | 000111 (7) | 000011 (3) |
| 000000 (0) | 111010 (58) | 000000 (0) |
| 000110 (6) | 000001 (1) | 000011 (3) |

As can be seen, this corrects the uncorrected hours and minutes (5:73) to the corrected hours and minutes (6:13).

Different constants can be utilized to correct many other formats. For example a 6 bit binary hour code could be caused to overflow into days when hours exceeded decimal numeral 23 merely by utilizing a constant of 40, (i.e. 64–24). It is pointed out that in such a correction, both hours digits are represented in a single field or character position. Consequently, care must be exercised to prevent interpretation of e.g. 16 hours as the character G. The hours are utilized in a single field in order to prevent the development of intercharacter carries in response to 4 and 14 hours but to assure its development in response to 24 hours. Other formats such as gallons, quarts, ounces, can also be corrected, it again being expeditious to represent these quantities in a single field.

In addition to being able to perform corrections of codes of the aforedescribed type, the teachings herein can be extended to permit operations on complements of codes which thereby enables the performance of subtraction.

More particularly, it is common for binary digital computers to perform substraction by developing the equivalent of the complement (either 2's or 1's) of the subtrahend and then adding it to the minuend to obtain the difference. For decimal arithmetic, the same procedure can be followed except a 10's or 9's complement is utilized. Prior to illustrating the use of this invention in the subtraction of character coded numbers, consider the following.

Example No. 10:

| (a) | | (b) | |
|---|---|---|---|
| 745 | | 745 | |
| −428 | or | +572 | (10's complement) |
| 317 | | [1]317 | |

It will be noted that a difference of 317 can be developed both by substracting the subtrehend from the minuend as in Example 10(*a*) or by adding the minuend and the complement of the subtrehend and ignoring a carry or overflow as in Example 10(b).

Attention is now called to Example 11.

Example No. 11:

| | | | |
|---|---|---|---|
| (*a*) (428) | 000100 | 000010 | 001000 |
| (*b*) (2's Comp. of 428) | 111100 | 111101 | 111000 |
| (*c*) (745) | 000111 | 000100 | 000101 |
| (*d*) (Uncorr. Diff.) | [1]000011 | [1]000001 | 111101 |

Note the binary equivalent of the decimal number 428 in line (a) and note its 2's complement in line (b). By adding line (b) to line (c) representing the binary equivalent of the decimal number 745, an uncorrected difference is obtained in line (d). This difference can be corrected by substantially the same procedure that was used to correct the uncorrected initial sum developed in Example No. 3.

More particularly, as shown below in Example No. 12, the characters of the uncorrected difference are each added to the 2's complement of the constant comprising decimal number 54 to develop an intermediate sum.

Example No. 12:

| | Character 1 | Character 2 | Character 3 |
|---|---|---|---|
| (Uncorrected Diff.) | 000011 | 000001 | 111101 |
| (2's Comp. of 54) | 001010 | 001010 | 001010 |
| (Intermediate Sum) | 001101 | 001011 | [1]000111 |

It will be recalled that the decimal number 54 was added to each of the characters in the initial sum in Example No. 4 to develop an intermediate sum. In the case of subtraction, as indicated in Example No. 12, carries developed are not propagated to the next character position. That is, note that the carry developed out of the character position 3 is not propagated into character position 2. The carries that are developed however, are utilized to determine whether the corresponding characters are in need of correction. That is, as before, a carry out of stage six of the full adder as a result of the addition in Example No. 12, indicates that the character in position 3 of the uncorrected difference has to be corrected. The lack of carries developed by stages 12 and 18 of the full adder indicates that the characters in positions 1 and 2 of the uncorrected difference need not be corrected.

Consequently, in Example No. 13, below, the 2's complement of decimal number 54 is added to character 3 of the uncorrected difference while nothing is added to characters 1 and 2 of the uncorrected difference. It will be noted that the resulting sum is the equivalent of the decimal number 317 as should be expected.

Example No. 13:

| | Character 1 | Character 2 | Character 3 |
|---|---|---|---|
| (Uncorrected Diff.) | 000011 | 000001 | 111101 |
| | 000000 | 000000 | 001010 |
| | 000011 (3) | 000001 (1) | [1] 000111 (7) |

In order to implement the means for correcting the uncorrected difference, the same hardware shown in FIGURE 1 can be utilized. The procedure is to enter the uncorrected difference shown in line A of Example No. 11 into the appropriate sections of the A register. The constant (i.e. the 2's complement of the decimal number 54) should be entered into each section of the E register. Carries developed out of the three full adder sections then determine whether the corresponding portion of the E register is to be cleared or whether it is to retain the constant therein. It is pointed out that whereas the carries developed by the full adder sections were propagated to adjacent sections in the development of an intermediate sum as in Example No. 4, because AND gates 35 were enabled the carries are not so propagated in Example No. 12 because control terminal 36 will be false and thereby disable gates 35.

Consequently, as a result of the development of the intermediate sum illustrated in Example No. 12, sections E1 and E2 are cleared and the constant is retained in section E3. A subsequent addition as represented by Example No. 13, will cause the corrected difference to be entered into the sections of the A register.

From the foregoing it should now be appreciated that means have been provided for permitting an uncorrected number stored in the A register to be corrected without necessitating that the characters of that number be unpacked, as required by prior arts methods and apparatus. Moreover, it has been shown that the invention is applicable to a considerable variety of formats and to different arithmetic operations. That is, the teachings herein are useful in not only correcting binary coded decimal information as shown in Examples 3, 4, and 5, which assumes a subset of ten codes out of a set of 64 possible codes, but in addition, is useful where the subsets are of a different size as shown in Example No. 9. Moreover, it is emphasized that each character position can be associated with a different radix or subset including a different number of codes. Further, the various character positions do not necessarily have to be of the same length.

In addition to correcting numbers represented in true form, a procedure is illustrated in Examples 11, 12 and 13 for correcting numbers in complementary form which is useful in correcting differences obtained as a result of subtraction operations.

The embodiments of the invention in which an exclusive property or privilege is claimed are defined as follows.

I claim:

1. Data processing apparatus including means for reducing each of a plurality of uncorrected character codes aranged in a packed format to a range whose upper limit is defined by a maximum character code in an associated subset of a set of character codes, said means comprising;

means for adding to each of said plurality of uncorrected character codes, an associated coded character constant representative of the difference between the maximum subset character code associated therewith and the maximum set character code to thereby develop a plurality of intermediate sum character codes;

means for determining which of said plurality of intermediate sum character codes exceeds said maximum set character code; and means for adding to each of said plurality of uncorrected character codes associated with each of said intermediate sum character codes exceeding said maximum set character code, the coded character constant associated therewith.

2. Data processing apparatus including means for reducing each of a plurality of uncorrected character codes arranged in a packed format to a range whose upper limit is defined by a maximum character code in an associated subset of a set of character codes, said means comprising:

means for adding to each of said plurality of uncorrected character codes, an associated coded character constant representative of the complement of the difference between the maximum subset character code associated therewith and the maximum set character code to thereby develop a pluraltiy of intermediate sum character codes;

means for determining which of said plurality of intermediate sum character codes exceeds said maximum set character code; and means for adding to each of said plurality of uncorrected character codes associated with each of said intermediate sum character codes exceeding said maximum set character code, the coded character constant associated therewith.

3. Digital data processing apparatus including:

a first register having input and output terminals;

a second register having input and output terminals;

a full adder circuit having a pair of data input terminals and carry and sum output terminals;

means connecting said first and second register output terminals to said pair of data input terminals;

first logical gating means coupling said first register output terminal and said carry output terminal to said first register input terminal;

second logical gating means coupling said sum output terminal to said second register input terminal; and control means for successively enabling said first and second logical gating means.

4. Digital data processing apparatus including:

a first register having input and output terminals;

a second register having input and output terminals;

a full adder circuit having a pair of data input terminals and carry and sum output terminals;

said full adder circuit including means for selectively providing either a first or second signal at said carry output terminal;

means connecting said first and second register output terminals to said pair of data input terminals;

means for storing an uncorrected code in said second register;

means for storing a code representative of a constant in said first register;

first logical gating means responsive to said first signal provided at said carry output terminal for clearing said first register;

second logical gating means coupling said sum output terminal to said second register input terminal; and control means for successively enabling said first and second logical gating means.

5. Digital data processing apparatus including:

a first register having *n* character sections of arbitrary and not necessarily uniform length, each section having an input terminal and an output terminal;

a second register having *n* character sections each of which is of the same length as a corresponding section in said first register, each section having an input terminal and an output terminal;

a full adder circuit having *n* character sections each of which is of the same length as corresponding sections in said first and second registers, each section having a pair of data input terminals, a carry output terminal, and a sum output terminal;

means connecting the output terminals of corresponding sections of said first and second registers respectively to the pair of data input terminals of a corresponding full adder character section;

*n* first logical gating means coupling each of said first register character section output terminals with the corresponding full adder section carry output terminal to the corresponding first register character section input terminal;

second logical gating means coupling each of said full adder character section sum output terminals to the corresponding second register character section input terminal; and control means for successively enabling said first and second logical gating means.

6. Digital data processing apparatus including:

a first register having input and output terminals;

a second register having input and output terminals;

a full adder circuit having a pair of data input terminals and carry and sum output terminals;

each of said full adder circuit character sections including means for selectivity providing either a first or second signal at its carry output terminal;

means connecting the output terminals of corresponding character sections of said first and second registers to the pair of data input terminals of a corresponding full adder circuit character section;

means for storing an uncorrected character code in each of said second register character sections;

means for storing a code representative of a constant character in each section of said first register;

first logical gating means responsive to said first signal provided at said carry output terminal of each of said full register character sections for clearing the corresponding first register character section;

second logical gating means coupling each of said full adder character sections sum output terminals to a corresponding second register character section input terminal; and control means for successively enabling said first and second logical gating means.

7. Digital data processing apparatus for reducing each of a plurality of uncorrected character codes arranged in a packed format to a range whose upper limit is defined by a maximum character code in an associated subset of a set of character codes, said apparatus comprising:

a first register having input and output terminals;

a second register having input and output terminals;

a full adder circuit having a pair of data input terminals and carry and sum output terminals;

each of said full adder character sections including means for selectively providing either a first or second signal at its carry output terminal;

means connecting the output terminals of corresponding first and second register character sections to the pair of data input terminals of the corresponding full adder circuit character section;

means for storing each of said plurality of uncorrected character codes in a different one of said second register character sections;

means for storing a coded character constant in each of said first register character sections, each character constant being representative of the compliment of the difference between the maximum subset character code associated with the character code stored in the corresponding second register character section and the maximum set character code;

*n* first logical gating means each responsive to said first signal provided at the carry output terminal of each of said full adder circuit character sections for clearing the corresponding first register character section;

*n* second logical gating means each coupling a full adder character section sum output terminal to the input terminal of a corresponding second register character section; and control means for successively enabling said first and second logical gating means.

8. The apparatus of claim 7 wherein each of said character codes consists of six binary digits whereby said set of character codes includes 64 codes, each code being equal to a different decimal numeral between zero and sixty-three.

9. The apparatus of claim 8 wherein said associated subset of said set of character codes includes ten character codes, each code being equal to a different decimal numeral between zero and nine.

10. The apparatus of claim 7 wherein the subset associated with said uncorrected character codes each contain a unique upper limit within the complete set of codes associated with the corresponding character code.

11. Digital data processing apparatus for reducing each of a plurality of uncorrected character codes arranged in a packed format to a range whose upper limit is defined by a maximum character code in an associated subset of a set of character codes, said apparatus comprising:

a first register having *n* character sections of arbitrary and not necessarily uniform length, each section having an input terminal and an output terminal;

a second register having *n* character sections each of which is of the same length as a corresponding section in said first register, each section having an input terminal and an output terminal;

a full adder circuit having *n* character sections each of which is of the same length as corresponding sections in said first and second registers, each section having a pair of data input terminals, a carry output terminal, and a sum output terminal;

each of said full adder character sections including means for selectively providing either a first or second signal at its carry output terminal;

means connecting the output terminals of corresponding first and second shift register character sections to the pair of data input terminals of the corresponding full adder circuit character section;

means for storing each of said plurality of uncorrected character codes in a different one of said second register character sections;

means for storing a coded character constant in each of said first register character sections, each character constant being representative of the compliment of the difference between the maximum subject character code associated with the character code stored in the corresponding second register character section and the maximum set character code;

*n* first logical gating means each responsive to said first signal provided at the carry output terminal of each of said full adder circuit character sections for clearing the corresponding first register character section;

*n* second logical gating means each coupling a full adder character section sum output terminal to the input terminal of a corresponding second register character section; and control means for successively enabling said first and second logical gating means.

No references cited.

MALCOLM A. MORRISON, *Primary Examiner.*

K. MILDE, *Assistant Examiner.*